(12) United States Patent
Yokoyama et al.

(10) Patent No.: US 11,777,344 B2
(45) Date of Patent: Oct. 3, 2023

(54) SIGNAL EMITTING APPARATUS AND SIGNAL TRANSMISSION/RECEPTION SYSTEM

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Hiroya Chiba, Susono (JP); Shuntaro Okazaki, Shizuoka-ken (JP); Shogo Tsuge, Fuji (JP); Kazuhisa Matsuda, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/840,611

(22) Filed: Jun. 15, 2022

(65) Prior Publication Data

US 2022/0407370 A1    Dec. 22, 2022

(30) Foreign Application Priority Data

Jun. 17, 2021   (JP) ................. 2021-101177

(51) Int. Cl.
| | |
|---|---|
| H02J 50/90 | (2016.01) |
| H02J 50/27 | (2016.01) |
| H02J 50/80 | (2016.01) |
| H01Q 1/32 | (2006.01) |

(52) U.S. Cl.
CPC ........... *H02J 50/90* (2016.02); *H01Q 1/3233* (2013.01); *H02J 50/27* (2016.02); *H02J 50/80* (2016.02)

(58) Field of Classification Search
CPC ...................................................... H02J 50/90
See application file for complete search history.

(56) References Cited

U.S. PATENT DOCUMENTS

| | | | |
|---|---|---|---|
| 2012/0161696 A1* | 6/2012 | Cook ................ | B60L 3/04 320/108 |
| 2015/0175025 A1 | 6/2015 | Barbul et al. | |
| 2015/0326032 A1* | 11/2015 | Azancot ............ | H02J 7/0044 307/104 |

FOREIGN PATENT DOCUMENTS

| | | |
|---|---|---|
| JP | 2014-225989 A | 12/2014 |
| JP | 2015-531064 A | 10/2015 |
| JP | 2018157686 A | 10/2018 |
| JP | 2021-083138 A | 5/2021 |

* cited by examiner

*Primary Examiner* — Daniel Kessie
(74) *Attorney, Agent, or Firm* — HAUPTMAN HAM, LLP

(57) ABSTRACT

A signal emitting apparatus provided in a vehicle to which power is transferred from a ground side power supplying apparatus by noncontact, includes: a signal emitting device for emitting a signal including information relating to the vehicle wirelessly toward the ground side power supplying apparatus; an outside environment acquiring part for acquiring information relating to an outside environment at surroundings of the ground side power supplying apparatus; and a control part for controlling the signal emitting device. The control part changes a mode of wireless signal emission of the signal emitting device in accordance with the outside environment.

12 Claims, 7 Drawing Sheets

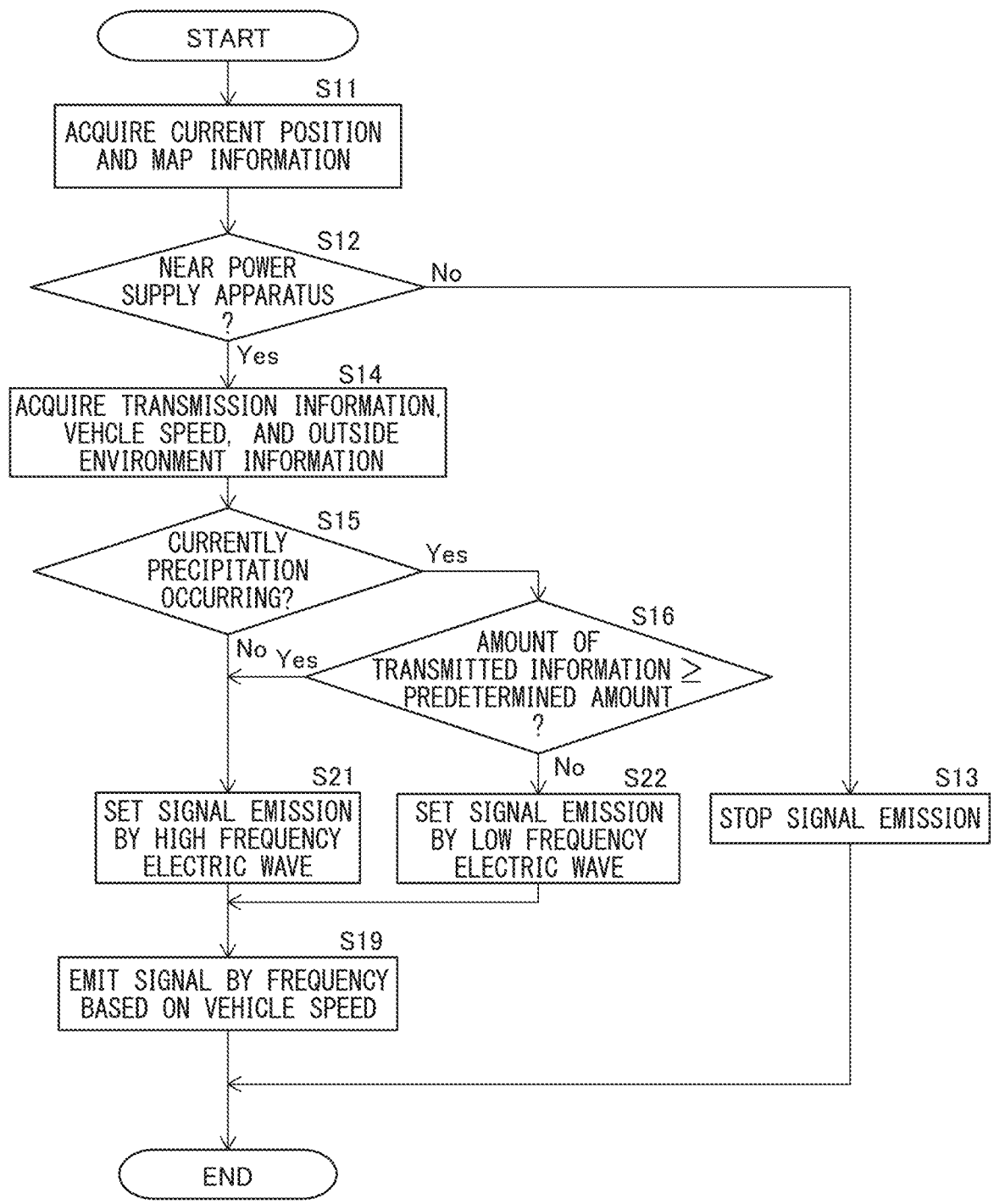

SIGNAL EMITTING APPARATUS AND SIGNAL TRANSMISSION/RECEPTION SYSTEM

RELATED APPLICATIONS

The present application claims priority of Japanese Patent Application No. 2021-101177 filed Jun. 17, 2021, the disclosure of which is hereby incorporated by reference herein in its entirety.

FIELD

The present disclosure relates to a signal emitting apparatus and signal transmission/reception system.

BACKGROUND

Noncontact power supply systems using transmission methods such as magnetic field coupling (electromagnetic induction), electric field coupling, magnetic field resonance coupling (magnetic field resonance), and electric field resonance coupling (electric field resonance) and other such transmission methods to transfer power from a ground side power supplying apparatus provided on a ground surface to a running vehicle by noncontact have been studied. In order to transfer power from a ground side power supplying apparatus to a vehicle by noncontact in this way, it is necessary to transmit information relating to the vehicle from the vehicle to the ground side power supplying apparatus, and control the ground side power supplying apparatus based on this information. As such a noncontact power supply system, a noncontact power supply system transferring power from a ground side power supplying apparatus to a running vehicle by noncontact, if a power supply request is wirelessly sent from the vehicle while the vehicle is running, has been studied (for example, JP2018-157686A).

SUMMARY

In this regard, in transmitting information relating to a vehicle from the vehicle to a ground side power supplying apparatus, there is a possibility that the information will not be able to be suitably transmitted to the ground side power supplying apparatus, depending on the outside environment at the surroundings of the ground side power supplying apparatus.

Considering the above problem, an object of the present disclosure is to provide a signal emitting apparatus or the like, which is able to transmit information from a vehicle to a ground side power supplying apparatus, regardless of an outside environment at the surroundings of the ground side power supplying apparatus.

The gist of the present disclosure is as follows.

(1) A signal emitting apparatus provided in a vehicle to which power is transferred from a ground side power supplying apparatus by noncontact,
the signal emitting apparatus comprising:
a signal emitting device for emitting a signal including information relating to the vehicle wirelessly toward the ground side power supplying apparatus;
an outside environment acquiring part for acquiring information relating to an outside environment at surroundings of the ground side power supplying apparatus; and
a control part for controlling the signal emitting device, wherein
the control part changes a mode of wireless signal emission of the signal emitting device in accordance with the outside environment.

(2) The signal emitting apparatus according to above (1), wherein
the signal emitting device comprises a magnetic field signal emitting device for emitting the signal toward the ground side power supplying apparatus not utilizing an electric wave but utilizing a magnetic field, and an electric wave signal emitting device for emitting the signal toward the ground side power supplying apparatus utilizing an electric wave, and
the control part switches the device used for emitting the signal toward the ground side power supplying apparatus, in accordance with the outside environment, between the magnetic field signal emitting device and the electric wave signal emitting device.

(3) The signal emitting apparatus according to above (2), wherein
the outside environment acquiring part acquires information relating to the presence of any precipitation at surroundings of the ground side power supplying apparatus as information relating to the outside environment, and
the control part makes the magnetic field signal emitting device emit the signal toward the ground side power supplying apparatus if there is currently precipitation at the surroundings of the ground side power supplying apparatus.

(4) The signal emitting apparatus according to above (2) or (3), wherein
the outside environment acquiring part acquires an amount of moisture at the road at the surroundings of the ground side power supplying apparatus as information relating to the outside environment, and
the control part makes the magnetic field signal emitting device emit the signal toward the ground side power supplying apparatus if the amount of moisture is greater than or equal to a predetermined reference amount of moisture.

(5) The signal emitting apparatus according to any one of above (2) to (4), wherein if the amount of the information to be transmitted to the ground side power supplying apparatus is greater than or equal to a reference amount of information, the control part makes the electric wave signal emitting device emit the signal toward the ground side power supplying apparatus, regardless of the outside environment.

(6) The signal emitting apparatus according to above (1), wherein
the signal emitting device has an electric wave signal emitting device for emitting the signal toward the ground side power supplying apparatus wirelessly by different frequency electric waves,
the outside environment acquiring part acquires information relating to a presence of any precipitation at the surroundings of the ground side power supplying apparatus as information relating to the outside environment, and
the control part makes the signal emitting device emit a signal of a low frequency electric wave toward the ground side power supplying apparatus if there is currently precipitation at the surroundings of the ground side power supplying apparatus, compared with if there is not currently precipitation.

(7) The signal emitting apparatus according to any one of above (1) to (6), wherein the control part makes a frequency of emission of the information lower if the speed of the vehicle is relatively slow, compared to if the speed of the vehicle is relatively fast.

(8) A signal transmission/reception system comprising a signal emitting apparatus according to any one of above (1) to (7) and a signal detecting apparatus provided at a ground side power supplying apparatus, wherein
the signal detecting apparatus detects the signal emitted from the signal emitting device by different modes of signal emission.

BRIEF DESCRIPTION OF DRAWINGS

FIG. 8 is a flow chart, similar to FIG. 5, showing a flow of signal emission processing performed by a signal emitting apparatus according to the second embodiment.

DESCRIPTION OF EMBODIMENTS

Figure 1:
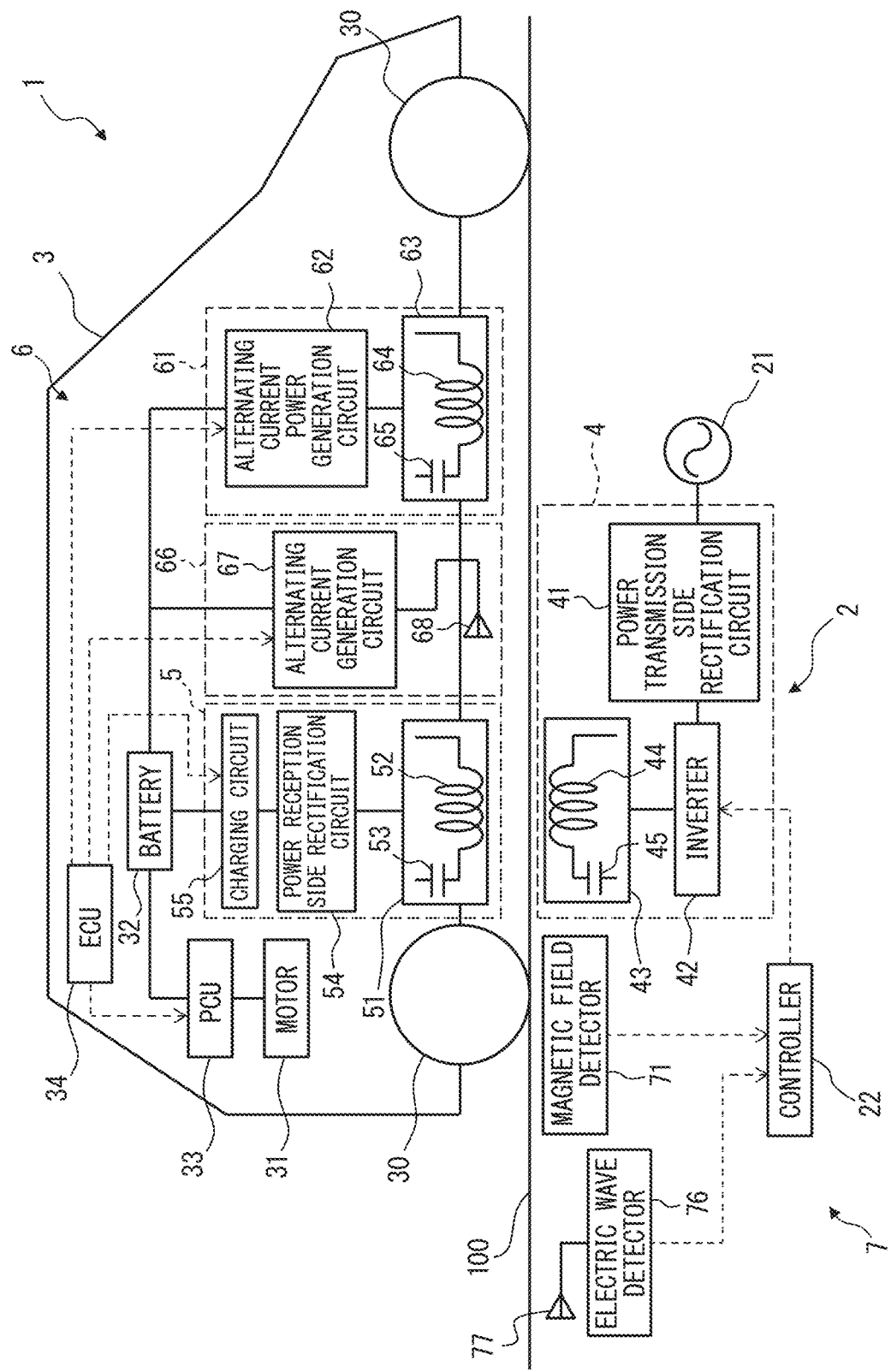
FIG. 1 is a view schematically showing the configuration of a noncontact power supply system.

Below, referring to the drawings, embodiments will be explained in detail. Note that, in the following explanation, similar elements will be assigned the same reference notations.

First Embodiment

Below, referring to FIGS. 1 to 6, a noncontact power supply system 1 having an information transmission/reception system according to a first embodiment will be explained.

FIG. 1 is a view schematically showing the configuration of a noncontact power supply system 1. The noncontact power supply system 1 has a ground side power supplying apparatus 2 and a vehicle 3 running on a road 100, and performs noncontact power transfer from the ground side power supplying apparatus 2 to the vehicle 3 by magnetic field resonance coupling (magnetic field resonance). In particular, in the present embodiment, the noncontact power supply system 1 transfers power by noncontact from the ground side power supplying apparatus 2 to the vehicle 3 when the vehicle 3 is running. The ground side power supplying apparatus 2 has a power transmission apparatus 4 configured to transmit power by noncontact, while the vehicle 3 has a power reception apparatus 5 configured to receive power from the power transmission apparatus 4 by noncontact. As shown in FIG. 1, the power transmission apparatus 4 is buried in the road 100 (in the ground) on which the vehicle 3 runs.

Configuration of Ground Side Power Supplying Apparatus

As shown in FIG. 1, the ground side power supplying apparatus 2 is provided with a power source 21 and a controller 22, in addition to the power transmission apparatus 4. The power source 21 and the controller 22 may be buried inside the road 100, and may be arranged at a location (including ground) separate from the inside of the road 100.

The power source 21 supplies power to the power transmission apparatus 4. The power source 21, for example, is a commercial alternating current power source for supplying single-phase alternating current power. Note that, the power source 21 may be, for example, an alternating current power source for supplying three-phase alternating current power or a direct current power source such as a fuel cell or solar cell.

The power transmission apparatus 4 sends the power supplied from the power source 21 to the vehicle 3. The power transmission apparatus 4 has a power transmission side rectification circuit 41, inverter 42, and power transmission side resonance circuit 43. In the power transmission apparatus 4, the alternating current power supplied from the power source 21 is rectified and converted to direct current power at the power transmission side rectification circuit 41, this direct current power is converted to alternating current power at the inverter 42, and this alternating current power is supplied to the power transmission side resonance circuit 43.

The power transmission side rectification circuit 41 is electrically connected to the power source 21 and inverter 42. The power transmission side rectification circuit 41 rectifies the alternating current power supplied from the power source 21 to convert it to direct current power, and supplies the direct current power to the inverter 42. The power transmission side rectification circuit 41 is, for example, an AC/DC converter.

The inverter 42 is electrically connected to the power transmission side rectification circuit 41 and power transmission side resonance circuit 43. The inverter 42 converts the direct current power supplied from the power transmission side rectification circuit 41 to an alternating current power of a frequency higher than the alternating current power of the power source 21 (high frequency power), and supplies the high frequency power to the power transmission side resonance circuit 43.

The power transmission side resonance circuit 43 has a resonator comprised of a coil 44 and capacitor 45. The various parameters of the coil 44 and capacitor 45 (outside diameter and inside diameter of the coil 44, the number of turns of the coil 44, electrostatic capacity of the capacitor 45, etc.) are determined so that the resonance frequency of the power transmission side resonance circuit 43 is a predetermined set value. The predetermined set value is, for example, 10 kHz to 100 GHz, preferably is the 85 kHz determined by the SAE TIR J2954 standard as the frequency band for noncontact power transfer.

The power transmission side resonance circuit 43 is arranged at the center of the lane on which the vehicle 3 runs so that the center of the coil 44 is positioned at the center of the lane. If the high frequency power supplied from the inverter 42 is applied to the power transmission side resonance circuit 43, the power transmission side resonance circuit 43 generates an alternating magnetic field for power transmission. Note that, if the power source 21 is a direct current power source, the power transmission side rectification circuit 41 may be omitted.

The controller 22 is, for example, a general-purpose computer, and performs various control operations of the ground side power supplying apparatus 2. For example, the controller 22 is electrically connected to the inverter 42 of the power transmission apparatus 4, and controls the inverter 42 so as to control power transmission by the power transmission apparatus 4.

Figure 2:
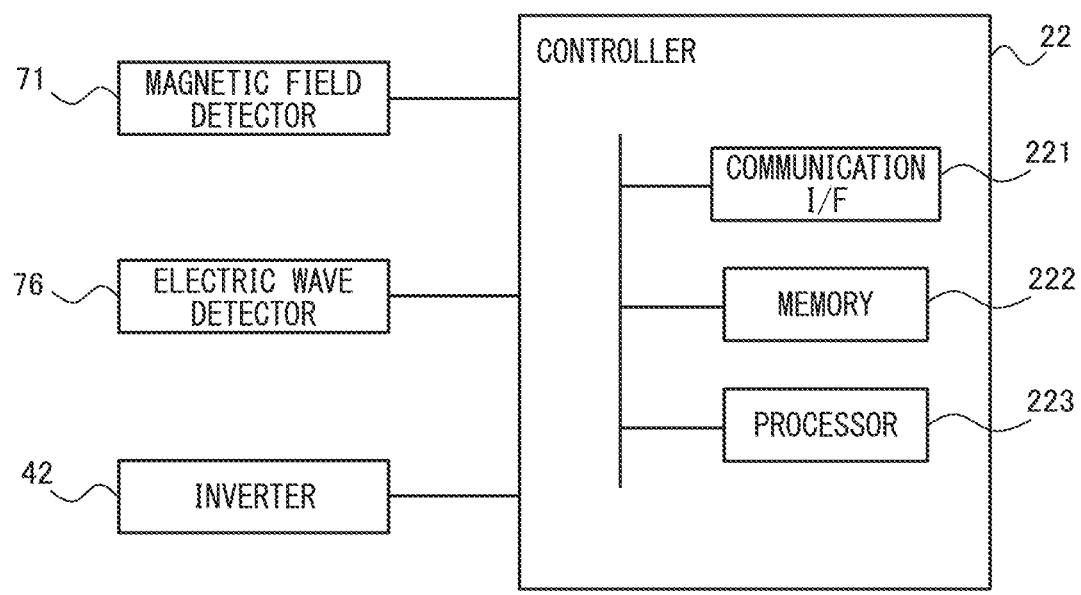
FIG. 2 is a schematic view of the configuration of a controller and equipment connected to the controller.

FIG. 2 is a schematic view of the configuration of the controller 22 and equipment connected to the controller 22. The controller 22 is provided with a communication interface 221, memory 222, and processor 223. The communication interface 221, memory 222, and processor 223 are electrically connected to each other through signal wires.

The communication interface 221 has an interface circuit for connecting the controller 22 to various equipment forming the ground side power supplying apparatus 2 (for example, the inverter 42, the later explained magnetic field detector 71 and electric wave detector 76, etc.) The controller 22 communicates with other equipment through the communication interface 221.

The memory 222, for example, has a volatile semiconductor memory (for example, RAM) and nonvolatile semiconductor memory (for example, ROM). The memory 222 stores a computer program for performing various processing at the processor 223, and various data or the like used when various processing is performed by the processor 223.

The processor 223 has one or more CPUs (central processing units) and their peripheral circuits. The processor 223 may further have a logic unit or arithmetic unit or other such processing circuit. The processor 223 performs various processing based on the computer program stored in the memory 222.

Configuration of Vehicle

On the other hand, the vehicle 3, as shown in FIG. 1, is provided with a motor 31, battery 32, power control unit (PCU) 33, and electronic control unit (ECU) 34, in addition to the power reception apparatus 5. In the present embodiment, the vehicle 3 is an electric vehicle (EV) using the motor 31 to drive the vehicle 3. However, the vehicle 3 may also be a hybrid vehicle (HV) using not only the motor 31, but also an internal combustion engine to drive the vehicle 3.

The motor 31 is, for example, an alternating current synchronous motor, and functions as an electric motor and a generator. When the motor 31 functions as an electric motor, it is driven using the power stored in the battery 32 as a source of power. The output of the motor 31 is transmitted through a decelerator and shaft to the wheels 30. On the other hand, at the time of deceleration of the vehicle 3, the motor 31 is driven by rotation of the wheels 30, and the motor 31 functions as a generator to generate regenerated power.

The battery 32 is a rechargeable secondary battery and is, for example, comprised of a lithium ion battery, nickel-hydrogen battery, etc. The battery 32 stores the power required for running the vehicle (for example, the drive power of the motor 31). If the regenerated power generated by the motor 31 is supplied to the battery 32, the battery 32 is charged and the state of charge (SOC) of the battery 32 is restored. Note that, the battery 32 may also be recharged through a charging port provided at the vehicle 3 by an outside power supply other than the ground side power supplying apparatus 2.

The PCU 33 is electrically connected to the battery 32 and motor 31. The PCU 33 has an inverter, booster converter, and DC/DC converter. The inverter converts the direct current power supplied from the battery 32 to alternating current power, and supplies the alternating current power to the motor 31. On the other hand, the inverter converts the alternating current power generated by the motor 31 (regenerated power) to direct current power, and supplies the direct current power to the battery 32. The booster converter boosts the voltage of the battery 32 in accordance with need when the power stored in the battery 32 is supplied to the motor 31. The DC/DC converter lowers the voltage of the battery 32 when the power stored in the battery 32 is supplied to the headlights or other electronic equipment.

The power reception apparatus 5 receives power from the power transmission apparatus 4, and supplies the received power to the battery 32. The power reception apparatus 5 has a power reception side resonance circuit 51, power reception side rectification circuit 54, and charging circuit 55.

The power reception side resonance circuit 51 is arranged at the bottom part of the vehicle 3 so that the distance from the road surface is small. In the present embodiment, the power reception side resonance circuit 51 is arranged at the center of the vehicle 3 in the vehicle width direction. The power reception side resonance circuit 51 has a configuration similar to the power transmission side resonance circuit 43, and has a resonator comprised of a coil 52 and capacitor 53. The various parameters of the coil 52 and capacitor 53 (outside diameter and inside diameter of the coil 52, the number of turns of the coil 52, electrostatic capacity of the capacitor 53, etc.) are determined so that the resonance frequency of the power reception side resonance circuit 51 conforms to the resonance frequency of the power transmission side resonance circuit 43. Note that, if the amount of deviation of the resonance frequency of the power reception side resonance circuit 51 and the resonance frequency of the power transmission side resonance circuit 43 is small, i.e., if, for example, the resonance frequency of the power reception side resonance circuit 51 is within a range of ±20% of the resonance frequency of the power transmission side resonance circuit 43, the resonance frequency of the power reception side resonance circuit 51 does not necessarily have to conform to the resonance frequency of the power transmission side resonance circuit 43.

As shown in FIG. 1, when the power reception side resonance circuit 51 faces the power transmission side resonance circuit 43, if an alternating magnetic field is generated by the power transmission side resonance circuit 43, vibration of the alternating magnetic field is transmitted to the power reception side resonance circuit 51 which resonates by the same resonance frequency as the power transmission side resonance circuit 43. As a result, an induction current flows in the power reception side resonance circuit 51 due to electromagnetic induction, and an induced electromotive force is generated at the power reception side resonance circuit 51 by the induction current. That is, the power transmission side resonance circuit 43 transmits power to the power reception side resonance circuit 51, and the power reception side resonance circuit 51 receives power from the power transmission side resonance circuit 43.

The power reception side rectification circuit 54 is electrically connected to the power reception side resonance circuit 51 and charging circuit 55. The power reception side rectification circuit 54 rectifies the alternating current power supplied from the power reception side resonance circuit 51 to convert it to direct current power, and supplies the direct current power to the charging circuit 55. The power reception side rectification circuit 54 is, for example, an AC/DC converter.

The charging circuit 55 is electrically connected to the power reception side rectification circuit 54 and the battery 32. The charging circuit 55 converts the direct current power supplied from the power reception side rectification circuit 54 to the voltage level of the battery 32, and supplies it to the battery 32. If the power transmitted from the power transmission apparatus 4 is supplied by the power reception apparatus 5 to the battery 32, the battery 32 is charged. The charging circuit 55 is, for example, a DC/DC converter.

The ECU 34 performs various control operations of the vehicle 3. For example, the ECU 34 is electrically connected to the charging circuit 55 of the power reception apparatus 5, and controls the charging circuit 55 so as to control the charging of the battery 32 by the power transmitted from the power transmission apparatus 4. Further, the ECU 34 is electrically connected to the PCU 33, and controls the PCU 33 so as to control the transfer of power between the battery 32 and the motor 31. Furthermore, the ECU 34 controls signal emitting devices including the later explained magnetic field signal emitting device 61 and electric wave signal emitting device 66.

Figure 3:
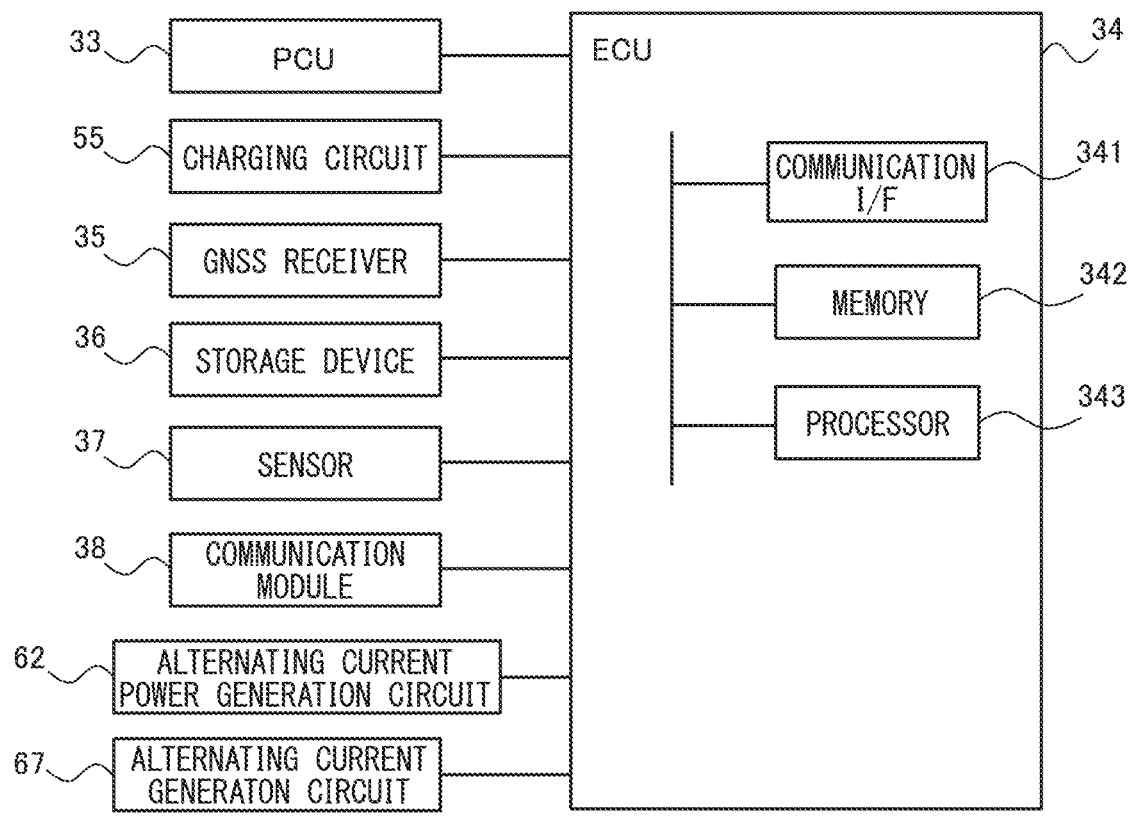
FIG. 3 is a schematic view of the configuration of an ECU and equipment connected to the ECU.

FIG. 3 is a schematic view of the configuration of the ECU 34 and equipment connected to the ECU 34. The ECU 34 has a communication interface 341, memory 342, and processor 343. The communication interface 341, memory 342, and processor 343 are connected to each other through signal wires.

The communication interface 341 has an interface circuit for connecting the ECU 34 to an internal vehicle network based on the CAN (Controller Area Network) or other standard. The ECU 34 communicates with other equipment through the communication interface 341.

The memory 342, for example, has a volatile semiconductor memory (for example, RAM) and nonvolatile semiconductor memory (for example, ROM). The memory 342 stores a computer program for performing various processing at the processor 343, and various data or the like used when various processing is performed by the processor 343.

The processor 343 has one or more CPUs (central processing units) and their peripheral circuits. The processor 343 may further have a logic unit or arithmetic unit or other such processing circuit. The processor 343 performs various processing based on the computer program stored in the memory 342.

Further, as shown in FIG. 3, the vehicle 3 is further provided with a GNSS receiver 35, storage device 36, a plurality of sensors 37, and a communication module 38. The GNSS receiver 35, storage device 36, and sensors 37 are electrically connected to the ECU 34.

The GNSS receiver 35 detects the current position of the vehicle 3 (for example, the latitude and longitude of the vehicle 3), based on the positioning information of a plurality (for example, three or more) positioning satellites. Specifically, the GNSS receiver 35 captures a plurality of positioning satellites, and receives signals emitted from the positioning satellites. Further, the GNSS receiver 35 calculates the distances to the positioning satellites based on a difference between the times of emission and times of reception of the signals, and detects the current position of the vehicle 3 based on the distances to the positioning satellites and the positions of the positioning satellites (orbital information). The output of the GNSS receiver 35, that is, the current position of the vehicle 3 detected by the GNSS receiver 35, is transmitted to the ECU 34. As the GNSS receiver 35, for example, a GPS receiver is used.

The storage device 36 stores data. The storage device 36 is, for example, provided with a hard disk drive (HDD), solid state drive (SSD), or optical recording medium. In the present embodiment, the storage device 36 stores map information. The map information includes, in addition to information relating to the roads, the installation positions and types of the ground side power supplying apparatuses 2 and information relating to outside environment in the surroundings of the ground side power supplying apparatuses 2 (for example, types of paving of roads at which the ground side power supplying apparatuses 2 are provided, or the like). The ECU 34 acquires the map information from the storage device 36. Note that, the storage device may be provided at the outside of the vehicle 3 (for example, a server), and the ECU 34 may acquire map information from the outside of the vehicle 3 through the communication module 38.

The sensors 37 detect the conditions of the vehicle 3 and the outside environment at the surroundings of the vehicle 3. In the present embodiment, the sensors 37 include, as a sensor for detecting a condition of the vehicle 3, for example, a speed sensor for detecting the speed of the vehicle 3. Further, the sensors 37 include, as a sensor for detecting the outside environment at the surroundings of the vehicle 3, a rain sensor for detecting raindrops on the surface of the vehicle 3. The outputs of these sensors 37 are input to the ECU 34.

The communication module 38 is equipment enabling wide area communication between the vehicle 3 and a server (not shown) at the outside of the vehicle 3, for example, is a data communication module (DCM). Wide area communication is communication with a communication distance of about 10 meters to about 10 kilometers. For example, LTE (Long Term Evolution) is used in the wide area communication.

Configuration of Signal Transmission/Reception System

As explained above, the noncontact power supply system 1 transfers power from a ground side power supplying apparatus 2 to the vehicle 3 through an alternating magnetic field generated at the power transmission side resonance circuit 43 of the power transmission apparatus 4. In order to perform such noncontact power transfer, it is necessary to transmit vehicle identification information or other information relating to the vehicle such as the demanded amount of power supply (below, referred to as the "vehicle information") from the running vehicle 3 to the ground side power supplying apparatus 2, and for the ground side power supplying apparatus 2 to control the power transmission apparatus 4 based on this vehicle information. For this reason, the noncontact power supply system 1 of the present embodiment has a signal transmission/reception system for transmitting a signal containing the vehicle information from the vehicle 3 to the ground side power supplying apparatus 2.

The signal transmission/reception system has a signal emitting apparatus 6 for wirelessly emitting a signal including vehicle information from the vehicle 3 to a ground side power supplying apparatus 2, and a signal detecting apparatus 7 for detecting the signal emitted from the signal emitting apparatus 6. In the present embodiment, the signal emitting apparatus 6 includes a magnetic field signal emitting device 61 for emitting a signal toward a ground side power supplying apparatus not utilizing an electric wave but utilizing a magnetic field, and an electric wave signal emitting device 66 for emitting a signal toward a ground side power supplying apparatus utilizing an electric wave, and an ECU 34 for controlling these magnetic field signal emitting device 61 and electric wave signal emitting device 66. The signal detecting apparatus 7 includes a magnetic field detector 71 for detecting a magnetic field including a signal emitted by the magnetic field signal emitting device 61, an electric wave detector 76 for detecting an electric wave including a signal emitted by the electric wave signal emitting device 66, and a controller 22 connected to these magnetic field detector 71 and electric wave detector 76.

The magnetic field signal emitting device 61 of the signal emitting apparatus 6 transmits vehicle information of the vehicle 3 to the ground side power supplying apparatus 2 through the alternating magnetic field. The magnetic field signal emitting device 61 is provided with an alternating current power generation circuit 62 and alternating magnetic field generation circuit 63.

The alternating current power generation circuit 62 is electrically connected to the battery 32 and alternating magnetic field generation circuit 63. The alternating current power generation circuit 62 generates alternating current power, and supplies the alternating current power to the alternating magnetic field generation circuit 63. For example, the alternating current power generation circuit 62 has an oscillation circuit, modulation circuit, and amplifier. The oscillation circuit generates a carrier wave, the modulation circuit modules the carrier wave in accordance with the vehicle information to be transmitted, and the amplifier amplifies the modulated alternating current power.

As shown in FIG. 1, the alternating magnetic field generation circuit 63 is arranged at the bottom part of the vehicle 3 so that the distance from the road surface is small. In the present embodiment, the alternating magnetic field generation circuit 63 is arranged at the center of the vehicle 3 in the vehicle width direction, and is arranged further to the front than the power reception side resonance circuit 51 in the front-back direction of the vehicle 3. Note that, the alternating magnetic field generation circuit 63 may also be arranged at the same position as the power reception side resonance circuit 51 or further to the back than the power reception side resonance circuit 51, in the front-back direction of the vehicle 3.

The alternating magnetic field generation circuit 63 has a configuration similar to the power transmission side resonance circuit 43 and power reception side resonance circuit 51, and has a resonator comprised of a coil 64 and capacitor 65. The various parameters of the coil 64 and capacitor 65 (outside diameter and inside diameter of coil 64, the number of turns of coil 64, electrostatic capacity of capacitor 65, etc.) are determined so that the resonance frequency of the alternating magnetic field generation circuit 63 is a predetermined set value. The predetermined set value is set to a value different from the resonance frequency of the power transmission side resonance circuit 43 and power reception side resonance circuit 51, that is, the resonance frequency of magnetic field resonance coupling. Further, the frequency of the alternating current power supplied from the alternating current power generation circuit 62 to the alternating magnetic field generation circuit 63 is set to the same value as the resonance frequency of the alternating magnetic field generation circuit 63. If the alternating current power supplied from the alternating current power generation circuit 62 is applied to the alternating magnetic field generation circuit 63, the alternating magnetic field generation circuit 63 generates an alternating magnetic field for information emission according to the modulated alternating current power.

As shown in FIG. 1, the alternating current power generation circuit 62 is electrically connected to the ECU 34, and the ECU 34 controls the alternating current power generation circuit 62. The alternating current power generation circuit 62 converts the direct current power from the battery 32 to alternating current power modulated according to the vehicle information, based on a command from the ECU 34, and supplies the alternating current power to the alternating magnetic field generation circuit 63.

For example, when the distance between the installation position of the ground side power supplying apparatus 2 and the vehicle 3 becomes less than or equal to a predetermined value, the ECU 34 controls the alternating current power generation circuit 62 to make it generate an alternating magnetic field for information transmission by the alternating magnetic field generation circuit 63 at predetermined time intervals. The distance between the installation position of the ground side power supplying apparatus 2 and the vehicle 3 is, for example, calculated by comparing the current position of the vehicle 3 detected by the GNSS receiver 35 and the installation position of the ground side power supplying apparatus 2 stored in the storage device 36. Note that, the ECU 34 may control the alternating current power generation circuit 62 to make it generate an alternating magnetic field by the alternating magnetic field generation circuit 63, when receiving a predetermined signal from a road side device provided in front of the ground side power supplying apparatus 2 through the communication module 38. Further, the ECU 34 may make the alternating magnetic field generation circuit 63 generate a weak alternating magnetic field by every certain time interval, while the vehicle 3 is running.

The magnetic field detector 71 of the signal detecting apparatus 7 detects a surrounding magnetic field. The magnetic field detector 71 is, for example, a magneto impedance (MI) sensor. The drive power of the magnetic field detector 71 is, for example, supplied from the power source 21 through the drive circuit to the magnetic field detector 71.

The magnetic field detector 71 is arranged further to the front than the power transmission side resonance circuit 43 of the power transmission apparatus 4 in the direction of advance of the vehicle 3 on the road at which the power transmission apparatus 4 is provided, and is arranged at the center of the lane on which the vehicle 3 passes. The magnetic field detector 71 is arranged in the ground (below the road surface) or on the road surface. If an alternating magnetic field for information transmission is emitted from the vehicle 3 in the surroundings of the magnetic field detector 71, the magnetic field detector 71 detects the alternating magnetic field for information transmission.

The magnetic field detector 71 is electrically connected to the controller 22, and the output of magnetic field detector 71 is transmitted to the controller 22. The controller 22 acquires the vehicle information transmitted from the vehicle 3 based on the output of the magnetic field detector 71, and controls the ground side power supplying apparatus 2 based on this vehicle information. That is, the controller 22 acquires the vehicle information transmitted from the vehicle 3 by detecting the alternating magnetic field for information transmission emitted from the alternating magnetic field generation circuit 63.

In the present embodiment, the frequency of the alternating magnetic field for information transmission differs from the resonance frequency of the power transmission side resonance circuit 43 and power reception side resonance circuit 51. For this reason, differentiation of the alternating magnetic field generated at the power transmission side resonance circuit 43 for power transfer and the alternating magnetic field generated at the alternating magnetic field generation circuit 63 for information transmission is easy. Preferably, the frequency of the alternating magnetic field for information transmission is set to a value lower than the resonance frequency of the power transmission side resonance circuit 43 and power reception side resonance circuit 51. Due to this, it is possible to more easily make the alternating magnetic field for information transmission be generated. For example, if the resonance frequency of the power transmission side resonance circuit 43 and power reception side resonance circuit 51 is 85 kHz, the frequency of the alternating magnetic field for information transmission is set to 500 Hz to 50 kHz, for example, 1 kHz.

The electric wave signal emitting device 66 of the signal emitting apparatus 6 transmits vehicle information of the vehicle 3 to the ground side power supplying apparatus 2 by an electric wave. The electric wave signal emitting device 66 is provided with an alternating current generation circuit 67 and antenna 68.

The alternating current generation circuit 67 is electrically connected to the battery 32 and antenna 68. The alternating current generation circuit 67 generates alternating current and supplies the alternating current to the antenna 68. For example, the alternating current generation circuit 67 has an oscillation circuit, modulation circuit, and amplifier. The oscillation circuit generates a carrier wave, the modulation circuit modulates the carrier wave in accordance with the vehicle information to be transmitted, and the amplifier amplifies the modulated alternating current.

The antenna 68, in the present embodiment, is arranged at the bottom part of the vehicle 3 so that the distance from the road surface is small. In the present embodiment, the antenna 68 is arranged at the center of the vehicle 3 in the vehicle width direction, and is arranged further to the front than the power reception side resonance circuit 51 in the front-back direction of the vehicle 3. Note that, the antenna 68 may be arranged at the same position as the power reception side resonance circuit 51 or further to the back than the power reception side resonance circuit 51, in the front-back direction of the vehicle 3. Further, the antenna 68 may be arranged at a place other than the bottom part of the vehicle 3 as long as the vehicle 3 can transmit an electric wave to the antenna 77 of the ground side power supplying apparatus 2 only when the vehicle 3 is approaching the ground side power supplying apparatus 2.

The antenna 68 is electrically connected to the alternating current generation circuit 67. The antenna 68 is supplied with the alternating current generated at the alternating current generation circuit 67. If alternating current is supplied from the alternating current generation circuit 67, the antenna 68 generates an electric wave for information emission corresponding to the modulated alternating current. The frequency of the generated electric wave is, for example, several hundred kHz to several GHz.

The electric wave detector 76 of the signal detecting apparatus 7 detects an electric wave of a specific frequency emitted from the electric wave signal emitting device 66. The electric wave detector 76 is arranged further to the front than the power transmission side resonance circuit 43 of the power transmission apparatus 4 in the direction of advance of the vehicle 3, on the road at which the power transmission apparatus 4 is provided, and is arranged at the center of the lane on which the vehicle 3 passes. The electric wave detector 76 is arranged in the ground (below the road surface) or on the road surface. If an electric wave for information transmission is emitted from a vehicle 3 at the surroundings of the electric wave detector 76, the electric wave detector 76 detects the electric wave for information transmission.

The electric wave detector 76 has an antenna 77, amplifier, and demodulation circuit. The antenna 77 converts an electric wave generated around the antenna 77 to an electric signal wave. The amplifier amplifies the signal wave converted at the antenna 77. The demodulation circuit retrieves the information incorporated in this signal wave from the signal wave amplified at the amplifier, specifically, the vehicle information.

The electric wave detector 76 is electrically connected to the controller 22. The output of the electric wave detector 76 is transmitted to the controller 22. The controller 22 acquires the vehicle information transmitted from the vehicle 3 based on the output of the electric wave detector 76, and controls the ground side power supplying apparatus 2 based on this vehicle information. That is, the controller 22 acquires the vehicle information transmitted from the vehicle 3 by detecting the electric wave emitted from the antenna 68.

In particular, in the present embodiment, the electric wave signal emitting device 66 and electric wave detector 76 are configured to perform dedicated short range communication of a communication distance of less than 10 meters. As dedicated short range communication, for example, RFID (Radio Frequency Identification), Bluetooth®, ZigBee®, etc., can be used.

Control of Signal Transmission/Reception System

As explained above, the signal transmission/reception system according to the present embodiment can use two different methods to transmit vehicle information from the vehicle 3 to a ground side power supplying apparatus 2. The first method is the method of sending and receiving a signal including vehicle information, not utilizing an electric wave but utilizing a magnetic field, by the magnetic field signal emitting device 61 and magnetic field detector 71. The second method is the method of sending and receiving a signal including vehicle information utilizing an electric wave by the electric wave signal emitting device 66 and electric wave detector 76.

In this regard, in sending and receiving a signal utilizing a magnetic field, it is not possible to raise the frequency of the generated alternating magnetic field to greater than or equal to a certain level. The amount of information which can be transferred through an alternating magnetic field in a unit time basically becomes greater as the frequency becomes higher, therefore in sending and receiving a signal utilizing a magnetic field, it is not possible to transfer that great amount of information. On the other hand, a signal utilizing an electric wave is sent and received by an electric wave of a relatively high frequency. Therefore, the amount of information which can be transferred through an electric wave is great. Therefore, from the viewpoint of transfer of a greater amount of information, sending and receiving a signal utilizing an electric wave is preferable.

On the other hand, in sending and receiving a signal utilizing an electric wave, if there is moisture between the electric wave signal emitting device 66 and the electric wave detector 76, the energy of the electric wave will be absorbed by the moisture, and the electric wave will be attenuated. Therefore, if there is moisture, the sensitivity of reception of the electric wave by the electric wave detector 76 falls. On the other hand, in sending and receiving a signal utilizing a magnetic field, even if moisture is present between the magnetic field signal emitting device 61 and the magnetic field detector 71, almost none of the energy of the magnetic field will be absorbed by the moisture, and accordingly the alternating magnetic field will not be attenuated much at all. Therefore, when moisture is present, it is preferable to utilize a magnetic field to send and receive a signal.

Therefore, in the present embodiment, the method of transmitting vehicle information from the vehicle 3 to the ground side power supplying apparatus 2 is changed, in accordance with the outside environment at the surroundings of the ground side power supplying apparatus 2, in particular, in accordance with the presence of precipitation at the surroundings of the ground side power supplying apparatus 2.

Figure 4:
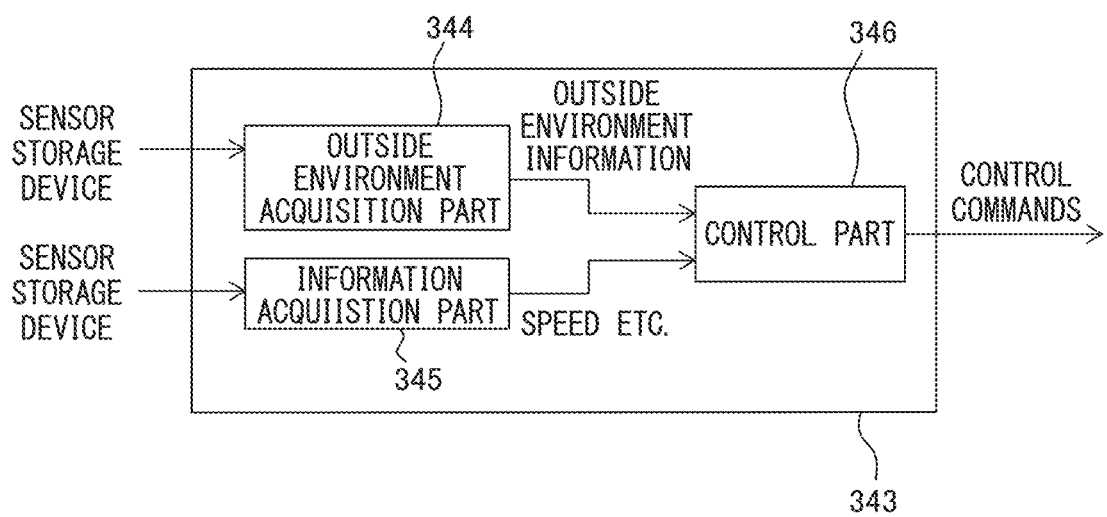
FIG. 4 is a functional block diagram relating to communication of information from a vehicle to a ground side power supplying apparatus, in a processor of the ECU.

FIG. 4 is a functional block diagram relating to communication of information from the vehicle 3 to a ground side power supplying apparatus 2, in the processor 343 of the ECU 3. As shown in FIG. 4, the processor 343 has an outside environment acquiring part 344 for acquiring the outside environment at the surroundings of the ground side power supplying apparatus, an information acquiring part 345 for acquiring information such as the speed of the vehicle 3 and information to be transmitted to the ground side power supplying apparatus 2, and a control part 346 for controlling signal emitting devices including the magnetic field signal emitting device 61 and electric wave signal emitting device 66. The functional blocks of the processor 343 are, for example, realized by a computer program operating on the processor 343. Alternatively, these functional blocks of the processor 343 may be dedicated processing circuits provided at the processor 343.

The outside environment acquiring part 344 receives as input the output of the sensor 37 for detecting the outside environment or information relating to the outside environment stored in the storage device 36. The outside environment acquiring part 344 outputs the information, input in this way, relating to the outside environment (outside environment information), to the control part 346.

The information acquiring part 345 receives as input the outputs of the sensors 37 for detecting conditions of the vehicle or information relating to the type of the ground side power supplying apparatus 2 stored at the storage device 36. The information acquiring part 345 outputs the information input in this way, to the control part 346.

The control part 346 receives as input, for example, the outside environment information from the outside environment acquiring part 344 and the information relating to the conditions of the vehicle from the information acquiring part 345. The control part 346 controls the signal emitting apparatus 6 based on the outside environment information and the information relating to the conditions of the vehicle. In particular, the control part 346 switches the device used for emitting a signal toward the ground side power supplying apparatus 2 between the magnetic field signal emitting device 61 and the electric wave signal emitting device 66, based on the information or the like.

Figure 5:
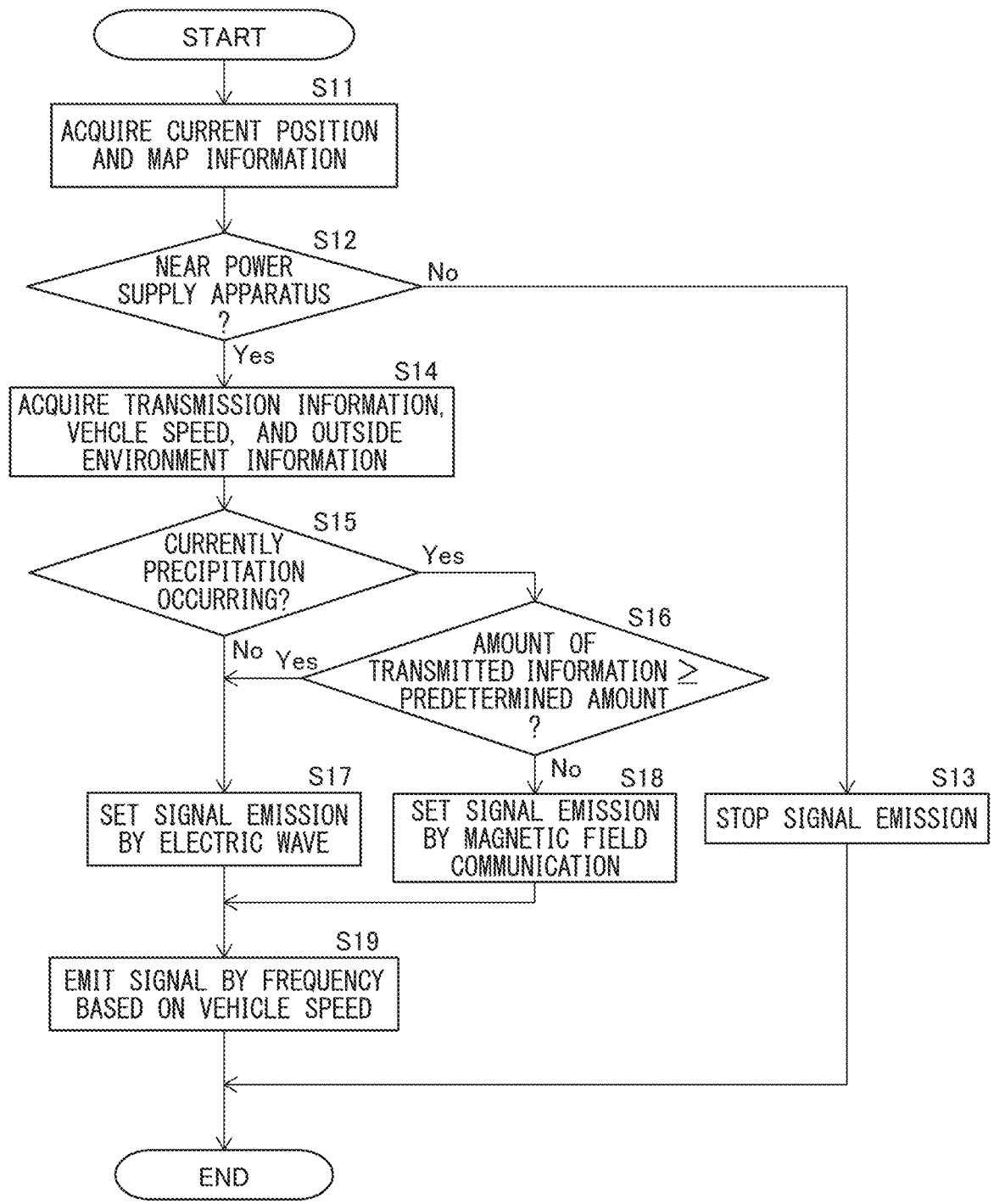
FIG. 5 is a flow chart showing a flow of signal emission processing performed by a signal emitting apparatus configuring part of a signal transmission/reception system.

FIG. 5 is a flow chart showing a flow of signal emission processing performed by the signal emitting apparatus 6 configuring part of the signal transmission/reception system. The illustrated signal emission processing is performed every certain time interval.

First, the outside environment acquiring part 344 acquire the current position of the vehicle 3 and the map information of the surroundings of the current position of the vehicle 3 (step S11). The outside environment acquiring part 344 acquires the current position of the vehicle 3 from the GNSS receiver 35. Further, the outside environment acquiring part 344 acquires map information of the surroundings of the current position of the vehicle 3 from the storage device 36, specifically the installation positions and types of the ground side power supplying apparatuses 2 in the surroundings of the current position.

Next, the outside environment acquiring part 344 judges whether the vehicle 3 is near a ground side power supplying apparatus 2, that is, if the distance between the installation position of the nearest ground side power supplying apparatus 2 in the direction of advance of the vehicle 3 and the current position of the vehicle 3 is less than or equal to a predetermined reference distance (step S12). The distance between the installation position of the ground side power supplying apparatus 2 and the current position of the vehicle 3 is calculated based on the current position of the vehicle 3 acquired at step S11 and the installation position of the ground side power supplying apparatus 2. The reference distance is in general, for example, set to a distance enabling the vehicle 3 to prepare for signal emission by the signal emitting apparatus 6 while the vehicle 3 is running over the reference distance. If it is judged that the vehicle 3 is not near a ground side power supplying apparatus 2 at step S12, the control part 346 stops signal emission by the signal emitting apparatus 6 (step S13).

On the other hand, if at step S12 it is judged that the vehicle 3 is near a ground side power supplying apparatus 2, the outside environment acquiring part 344 acquires information relating to the outside environment in the surroundings of the ground side power supplying apparatus 2. In addition, in the present embodiment, the information acquiring part 345 acquires the speed of the vehicle 3 and information to be transmitted to the ground side power supplying apparatus 2 (step S14).

In the present embodiment, the outside environment acquiring part 344 acquires, as the outside environment, information relating to the presence of any precipitation in the surroundings of the vehicle 3, based on the amount of raindrops on the surface of the vehicle 3 detected by a rain sensor, which is one of the sensors 37, therefore acquires information relating to the presence of any precipitation in the surroundings of the ground side power supplying apparatus 2 near the vehicle 3. The information acquiring part 345 acquires the current speed of the vehicle 3 detected by a speed sensor of one of the sensors 37.

Further, in the present embodiment, the information acquiring part 345, for example, acquires information to be transmitted to the ground side power supplying apparatus 2 near the vehicle 3, based on the type of the ground side power supplying apparatus 2. Here, in order to suitably supply power from the ground side power supplying apparatus 2 to the vehicle 3, it is necessary to transmit vehicle information including the vehicle identification information or the demanded amount of power supply, etc., from the vehicle 3 to the ground side power supplying apparatus 2. Among them, in a signal transmission/reception system including the signal emitting apparatus 6 and signal detecting apparatus 7, it is essential to transmit vehicle identification information in order to identify the vehicle 3 positioned on the ground side power supplying apparatus 2 to be supplied with power from the ground side power supplying apparatus 2. On the other hand, for example, the demanded amount of power supply and other vehicle information does not necessarily have to be transmitted by the signal transmission/reception system, if they can be transmitted in advance to the ground side power supplying apparatus 2 linked with the vehicle identification information through the communication module 38 and server. Therefore, if the ground side power supplying apparatus 2 near the vehicle 3 is a type able to be sent the demanded amount of power supply and other vehicle information in advance from the communication module 38 through the server, the information acquiring part 345 acquires the vehicle identification information as information to be transmitted. On the other hand, if the ground side power supplying apparatus 2 near the vehicle 3 is of a type which cannot be sent the demanded amount of power supply and other vehicle information in advance from communication module 38 through the server, the information acquiring part 345 acquires, as the information to be transmitted, information including the demanded amount of power supply and other information in addition to the vehicle identification information.

If acquiring information relating to the outside environment, the control part 346 judges whether there is currently any precipitation occurring at the surroundings of the ground side power supplying apparatus 2 (step S15). In addition, the control part 346 judges whether the amount of information to be transmitted to the ground side power supplying apparatus 2 is greater than or equal to a reference amount of information (step S16). In this regard, the reference amount of information is any amount greater than the minimum amount of information (for example, only the vehicle identification information) and less than the maximum amount of information (for example, all information required for power supply, including the demanded amount of power supply).

If at step S15 it is judged that there is currently no precipitation occurring at the surroundings of the ground side power supplying apparatus 2 or if it is judged that, at step S16, there is currently precipitation occurring at the surroundings of the ground side power supplying apparatus 2 and, at step S16, the amount of information to be transmitted is greater than or equal to the reference amount of information, the control part 346 sets the electric wave signal emitting device 66 as the device for emitting a signal including vehicle information to the ground side power supplying apparatus 2 (step S17). On the other hand, if it is judged that, at step S15, there is currently precipitation at the surroundings of the ground side power supplying apparatus 2 and, at step S16, the amount of information to be transmitted is less than the reference amount of information, the control part 346 sets the magnetic field signal emitting device 61 as the device for emitting a signal including vehicle information to the ground side power supplying apparatus 2 (step S18).

Figure 6:
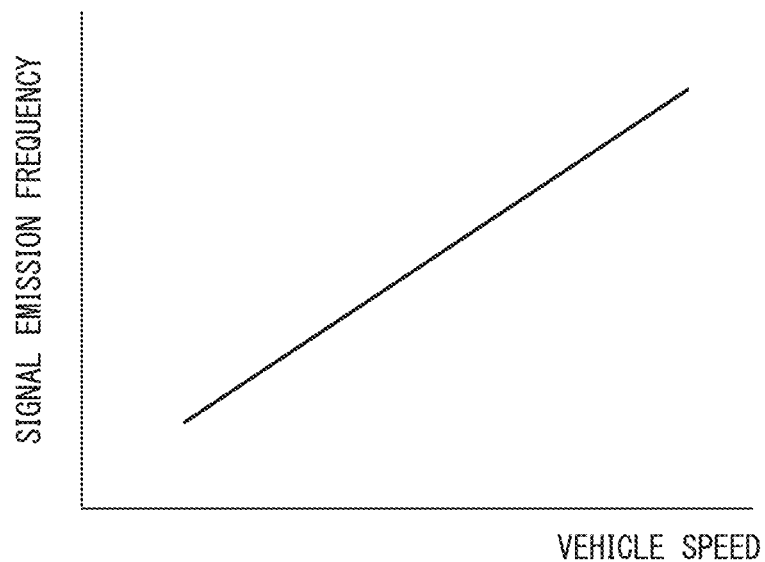
FIG. 6 is a view showing a relationship between a speed of the vehicle and a frequency of emission of a signal by an electric wave signal emitting device or magnetic field signal emitting device.

After that, the control part 346 makes the device set at step S17 or S18 among the electric wave signal emitting device 66 and magnetic field signal emitting device 61, emit a signal including the vehicle information by a frequency based on the speed of the vehicle 3 (step S19). FIG. 6 is a view showing a relationship between the speed of the vehicle 3 and the frequency of emission of a signal by the electric wave signal emitting device 66 or magnetic field signal emitting device 61. As shown in FIG. 6, in the present embodiment, the frequency of emission becomes greater as the speed of the vehicle 3 becomes faster. Due to this, it is possible to make the interval of distance at which a signal is emitted by the signal emitting apparatus 6 a constant one, and accordingly keep down missed detection by the signal detecting apparatus 7.

Note that, in the present embodiment, the frequency of emission becomes continuously greater as the speed of the vehicle 3 becomes faster, but the frequency of emission may also become greater in stages as the speed of the vehicle 3 becomes faster. Therefore, the control part 346 can be said to make the frequency of emission of information lower if the speed of the vehicle 3 is relatively slow, compared to if the speed of the vehicle 3 is relatively fast.

As explained above, in the present embodiment, basically, if there is currently precipitation, the magnetic field signal emitting device 61 is used for signal emission utilizing a magnetic field, while if there is currently no precipitation occurring, the electric wave signal emitting device 66 is used for signal emission utilizing an electric wave. For this reason, it is possible to transmit a signal without causing a drop in sensitivity in reception at the ground side power supplying apparatus 2. Therefore, it is possible to transmit information from the vehicle 3 to the ground side power supplying apparatus 2 regardless of the outside environment at the surroundings of the ground side power supplying apparatus 2.

However, in the present embodiment, if the amount of information to be transmitted to the ground side power supplying apparatus 2 is great, regardless of the presence of any precipitation, signal emission utilizing an electric wave is performed. For this reason, if it is not possible to sufficiently transmit information by signal emission utilizing a magnetic field, signal emission utilizing an electric wave is performed, while the electric wave will be attenuated somewhat due to moisture. Due to this, it is possible to keep information from becoming unable to be sufficiently transmitted.

Modifications

In the above embodiment, the mode of signal emission by the signal emitting apparatus 6 is changed, based on the presence of any precipitation at the surroundings of the ground side power supplying apparatus 2. However, the mode of signal emission by the signal emitting apparatus 6 may also be changed, based on other parameters relating to the amount of moisture on the road or in the road at the surroundings of the ground side power supplying apparatus 2.

Specifically, the outside environment acquiring part 344 may also acquire, for example, the amount of moisture on the road or in the road at the surroundings of the ground side power supplying apparatus 2. In this case, the outside environment acquiring part 344, for example, acquires the amounts of precipitation at different locations from the server through the communication module 38, and estimates the amount of moisture at a road at the surroundings of a ground side power supplying apparatus 2, based on such an amount of precipitation. If the amount of moisture estimated in this way is greater than or equal to a predetermined reference amount of moisture, the control part 346 makes the magnetic field signal emitting device 61 emit a signal toward the ground side power supplying apparatus 2. On the other hand, if the amount of moisture estimated in this way is less than the predetermined reference amount of moisture, the control part 346 makes the electric wave signal emitting device 66 emit a signal toward the ground side power supplying apparatus 2. Note that, the reference amount of moisture is an amount of moisture by which an electric wave emitted from the electric wave signal emitting device 66 would be attenuated and the electric wave detector 76 would no longer be able to suitably detect the electric wave.

Further, the control part 346 may also switch a device to be used for emitting a signal between the magnetic field signal emitting device 61 and electric wave signal emitting device 66, based on whether there is currently precipitation at the surroundings of the ground side power supplying apparatus 2, regardless of the amount of information to be transmitted. In this case, the control part 346 makes the magnetic field signal emitting device 61 emit a signal toward the ground side power supplying apparatus 2 if there is currently precipitation occurring at the surroundings of the ground side power supplying apparatus 2, and makes the electric wave signal emitting device 66 emit a signal toward the ground side power supplying apparatus 2 if there is currently no precipitation occurring.

Second Embodiment

Next, referring to FIGS. 7 and 8, a noncontact power supply system having an information transmitting system according to a second embodiment will be explained. Below, parts different from the noncontact power supply system 1 according to the first embodiment will be mainly explained.

Figure 7:
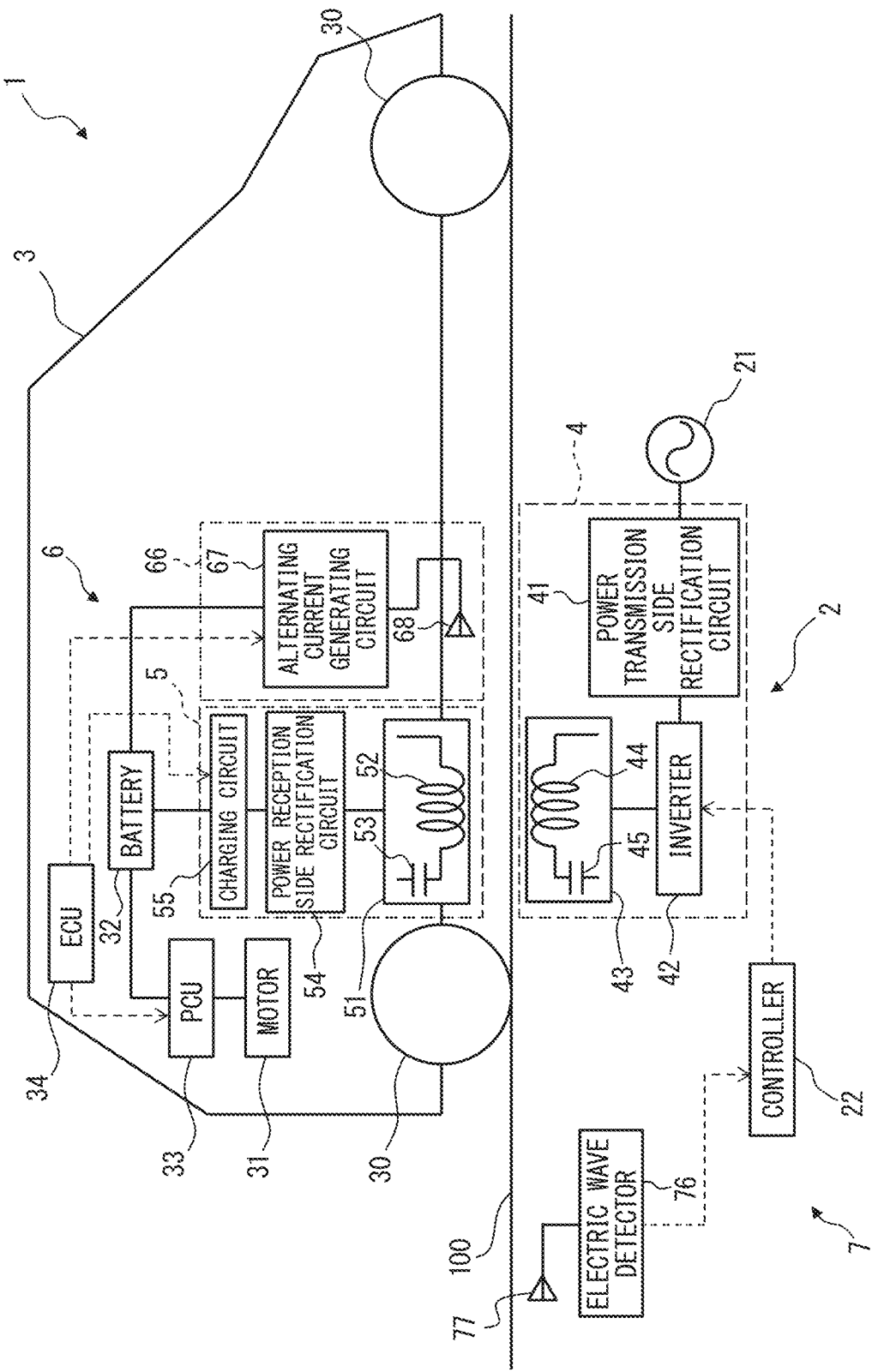
FIG. 7 is a view schematically showing the configuration of a noncontact power supply system according to a second embodiment.

FIG. 7 is a view schematically showing the configuration of the noncontact power supply system 1 according to the second embodiment. As will be understood from FIG. 7, in the noncontact power supply system 1 according to the second embodiment, the signal emitting apparatus 6 has the electric wave signal emitting device 66, but does not have the magnetic field signal emitting device 61. Similarly, the signal detecting apparatus 7 has the electric wave detector 76, but does not have the magnetic field detector 71. However, the electric wave signal emitting device 66 can wirelessly emit a signal toward the ground side power supplying apparatus in different frequency electric waves. Specifically, the electric wave signal emitting device 66 can generate a low frequency electric wave signal (for example, several hundred kHz to tens of MHz) and a high frequency electric wave signal (for example, several hundred MHz to several GHz).

In this regard, when sending and receiving a signal utilizing an electric wave, the higher the frequency of the electric wave, the greater the amount of information which can be transmitted through the electric wave per unit time. Therefore, from the viewpoint of transmitting more information, it is preferable to utilizing a high frequency electric wave to send and receive a signal. On the other hand, as explained above, in sending and receiving a signal utilizing a electric wave, if there is moisture between the electric wave signal emitting device 66 and the electric wave detector 76, the energy of the electric wave will be absorbed by the moisture, and the electric wave will be attenuated. Such attenuation of an electric wave is greater at a high frequency compared with a low frequency. Therefore, when there is moisture, it is preferable to utilize a low frequency electric wave to send and receive a signal.

Therefore, in the present embodiment, the frequency of the electric wave when vehicle information is transmitted from the vehicle 3 to the ground side power supplying apparatus 2 is changed in accordance with the outside environment at the surroundings of the ground side power supplying apparatus 2, in particular, in accordance with the presence of any precipitation at the surroundings of the ground side power supplying apparatus 2.

FIG. 8 is a flow chart, similar to FIG. 5, showing a flow of signal emission processing performed by a signal emitting apparatus 6 according to the second embodiment. The illustrated signal emission processing is performed every certain time interval. Note that, explanations of steps similar to FIG. 5 will be omitted.

If at step S15 it is judged that there is currently no precipitation occurring at the surroundings of the ground side power supplying apparatus 2 or if it is judged that, at step S15, there is currently precipitation at the surroundings of the ground side power supplying apparatus 2 and, at step S16, the amount of information to be transmitted is greater than or equal to a reference amount of information, the control part 346 sets a high frequency electric wave as the electric wave to be emitted from the electric wave signal emitting device 66 (step S21). On the other hand, if it is judged that, at step S15, there is currently precipitation at the surroundings of the ground side power supplying apparatus 2 and, at step S16, the amount of information to be transmitted is less than the reference amount of information, the control part 346 sets a low frequency electric wave as the electric wave for emission from the electric wave signal emitting device 66 (step S22).

Note that, the control part 346 may set the frequency of the electric wave emitted from the electric wave signal emitting device 66, based on whether there is currently precipitation at the surroundings of the ground side power supplying apparatus 2, regardless of the amount of information to be transmitted. In this case, if there is currently precipitation at the surroundings of the ground side power supplying apparatus 2, the electric wave signal emitting device 66 emits a signal toward the ground side power supplying apparatus 2 by a lower frequency electric wave, compared to if there is currently no precipitation occurring.

Above, preferred embodiments according to the present disclosure were explained, but the present disclosure is not limited to these embodiments. Various corrections and changes can be made within the language of the claims.

The invention claimed is:

1. A signal emitting apparatus provided in a vehicle to which power is transferred from a ground side power supplying apparatus by noncontact, the signal emitting apparatus comprising:
   a signal emitting device for emitting a signal including information relating to the vehicle wirelessly toward the ground side power supplying apparatus; and
   a processor, wherein
   the processor is configured to:
      acquire information relating to an outside environment at surroundings of the ground side power supplying apparatus, and
      control the signal emitting device,
   the processor is configured to change a mode of wireless signal emission of the signal emitting device in accordance with the outside environment,
   the signal emitting device comprises:
      a magnetic field signal emitting device for emitting the signal toward the ground side power supplying apparatus not utilizing an electric wave but utilizing a magnetic field, and
      an electric wave signal emitting device for emitting the signal toward the ground side power supplying apparatus utilizing an electric wave,
   the processor is configured to switch the device used for emitting the signal toward the ground side power supplying apparatus, in accordance with the outside environment, between the magnetic field signal emitting device and the electric wave signal emitting device,
   the processor is configured to acquire information relating to the presence of any precipitation at surroundings of the ground side power supplying apparatus as information relating to the outside environment,
   the processor is configured to make the magnetic field signal emitting device emit the signal toward the ground side power supplying apparatus in response to the information relating to the outside environment indicating that there is currently precipitation at the surroundings of the ground side power supplying apparatus, and
   the processor is configured to acquire the information relating to the outside environment based on an amount of raindrops on a surface of the vehicle detected by a rain sensor.

2. A signal emitting apparatus provided in a vehicle to which power is transferred from a ground side power supplying apparatus by noncontact, the signal emitting apparatus comprising:

a signal emitting device for emitting a signal including information relating to the vehicle wirelessly toward the ground side power supplying apparatus; and a processor, wherein the processor is configured to:
acquire information relating to an outside environment at surroundings of the ground side power supplying apparatus, and
control the signal emitting device, the processor is configured to change a mode of wireless signal emission of the signal emitting device in accordance with the outside environment, the signal emitting device comprises:
a magnetic field signal emitting device for emitting the signal toward the ground side power supplying apparatus not utilizing an electric wave but utilizing a magnetic field, and
an electric wave signal emitting device for emitting the signal toward the ground side power supplying apparatus utilizing an electric wave, the processor is configured to switch the device used for emitting the signal toward the ground side power supplying apparatus, in accordance with the outside environment, between the magnetic field signal emitting device and the electric wave signal emitting device, the processor is configured to acquire an amount of moisture at the road at the surroundings of the ground side power supplying apparatus as information relating to the outside environment, the processor is configured to make the magnetic field signal emitting device emit the signal toward the ground side power supplying apparatus in response to the information relating to the outside environment indicating that the amount of moisture is greater than or equal to a predetermined reference amount of moisture, and the processor is configured to acquire the information relating to the outside environment from a server.

3. The signal emitting apparatus according to claim 1, wherein
the processor is configured to, in response to an amount of the information relating to the vehicle to be transmitted to the ground side power supplying apparatus being greater than or equal to a reference amount of information, make the electric wave signal emitting device emit the signal toward the ground side power supplying apparatus, regardless of the outside environment.

4. A signal emitting apparatus provided in a vehicle to which power is transferred from a ground side power supplying apparatus by noncontact, the signal emitting apparatus comprising:
a signal emitting device for emitting a signal including information relating to the vehicle wirelessly toward the ground side power supplying apparatus; and
a processor, wherein
the processor is configured to:
acquire information relating to an outside environment at surroundings of the ground side power supplying apparatus, and
control the signal emitting device,
the processor is configured to change a mode of wireless signal emission of the signal emitting device in accordance with the outside environment,
the signal emitting device has an electric wave signal emitting device for emitting the signal toward the ground side power supplying apparatus wirelessly by electric waves of different frequencies, the processor is configured to acquire information relating to a presence of any precipitation at the surroundings of the ground side power supplying apparatus as the information relating to the outside environment, the processor is configured to make the signal emitting device emit the signal toward the ground side power supplying apparatus
by an electric wave of a first frequency, in response to the information relating to the outside environment indicating that there is currently precipitation at the surroundings of the ground side power supplying apparatus, and
by an electric wave of a second frequency higher than the first frequency, in response to the information relating to the outside environment indicating that there is not currently precipitation, and the processor is configured to acquire the information relating to the outside environment based on an amount of raindrops on a surface of the vehicle detected by a rain sensor.

5. The signal emitting apparatus according to claim 1, wherein
the processor is configured to make a frequency of emission of the information relating to the vehicle lower in response to a speed of the vehicle being relatively slow, compared to the speed of the vehicle being relatively fast.

6. A signal transmission/reception system, comprising:
a signal emitting apparatus according to claim 1; and
a signal detecting apparatus provided at a ground side power supplying apparatus, wherein
the signal detecting apparatus is configured to detect the signal emitted from the signal emitting device by different modes of signal emission.

7. The signal emitting apparatus according to claim 2, wherein
the processor is configured to, in response to an amount of the information relating to the vehicle to be transmitted to the ground side power supplying apparatus being greater than or equal to a reference amount of information, make the electric wave signal emitting device emit the signal toward the ground side power supplying apparatus, regardless of the outside environment.

8. The signal emitting apparatus according to claim 2, wherein
the processor is configured to make a frequency of emission of the information relating to the vehicle lower in response to a speed of the vehicle being relatively slow, compared to the speed of the vehicle being relatively fast.

9. A signal transmission/reception system, comprising:
a signal emitting apparatus according to claim 2; and
a signal detecting apparatus provided at a ground side power supplying apparatus, wherein
the signal detecting apparatus is configured to detect the signal emitted from the signal emitting device by different modes of signal emission.

10. The signal emitting apparatus according to claim 4, wherein
the processor is configured to, in response to an amount of the information relating to the vehicle to be transmitted to the ground side power supplying apparatus being greater than or equal to a reference amount of information, make the electric wave signal emitting device emit the signal toward the ground side power supplying apparatus by the electric wave of the second frequency, regardless of the outside environment.

11. The signal emitting apparatus according to claim 4, wherein
the processor is configured to make a frequency of emission of the information relating to the vehicle lower in response to a speed of the vehicle being relatively slow, compared to the speed of the vehicle being relatively fast.

12. A signal transmission/reception system, comprising:
a signal emitting apparatus according to claim 4; and
a signal detecting apparatus provided at a ground side power supplying apparatus, wherein
the signal detecting apparatus is configured to detect the signal emitted from the signal emitting device by different modes of signal emission.

* * * * *